May 17, 1960     S. MILLER     2,936,926
PAIL HOLDER
Filed June 28, 1956
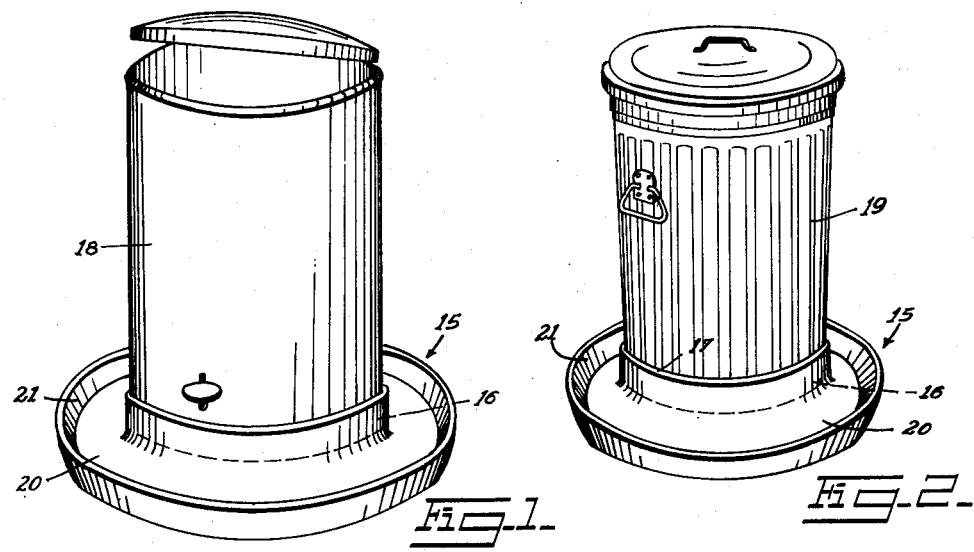
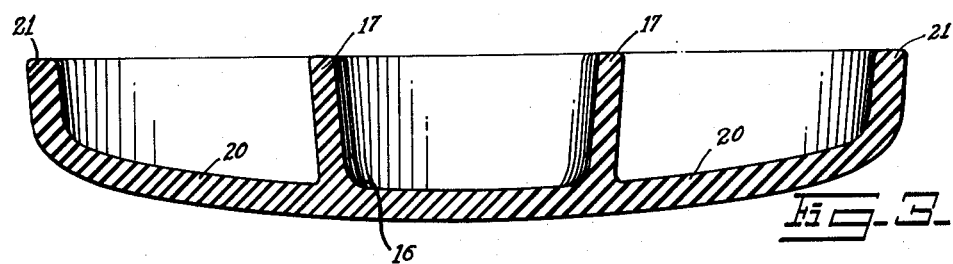
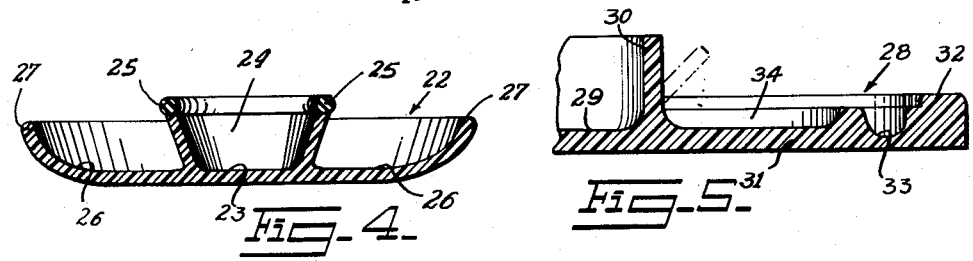
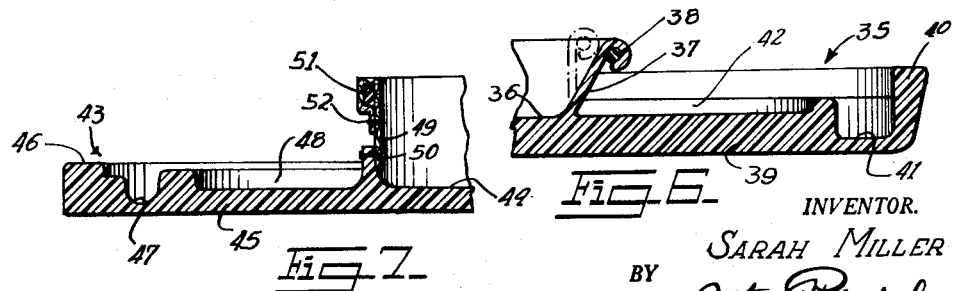
INVENTOR.
SARAH MILLER
BY
ATTORNEY United States Patent Office 2,936,926
Patented May 17, 1960

2,936,926

PAIL HOLDER

Sarah Miller, Corona, N.Y.

Application June 28, 1956, Serial No. 594,616

1 Claim. (Cl. 220—85)

This invention relates to new and useful improvements in garbage pail holders.

More particularly, the present invention proposes the construction of an improved garbage pail holder for both indoor and outdoor pails which will securely and removably hold the garbage pail and will collect and retain any spillage therefrom.

Another object of the present invention proposes forming the garbage pail holder with a cup having a raised annular lip to receive the bottom portion of a garbage pail and tightly grip it and an apron with a raised peripheral edge to catch and confine any droppings from the pail.

Still further, the present invention proposes constructing the apron so that it slopes upwardly from the centrally disposed cup to its peripheral edge so that liquids and semi-liquids will be gathered adjacent the cup close to the pail.

As a further object, the prevent invention proposes forming the annular lip of the cup with an elastic band secured to the top thereof for close gripping of the garbage pail.

The present invention further proposes forming the holder with integral parts and molding it of resilient material such as hard rubber or plastic to protect the garbage pail and the surface therebeneath.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of an indoor "step-on" garbage pail or can in a holder constructed and arranged in accordance with one form of the present invention.

Fig. 2 is a similar view of the holder and an outdoor galvanized garbage pail or can.

Fig. 3 is an enlarged cross-sectional view of the holder shown in Figs. 1 and 2.

Fig. 4 is a view similar to Fig. 3 but illustrating a modification of the present invention.

Fig. 5 is a fragmentary sectional view of a garbage pail holder illustrating another modification of the present invention.

Fig. 6 is a view similar to Fig. 5 but illustrating a further modification.

Fig. 7 is a view similar to Figs. 5 and 6 but illustrating a still further modification of the present invention.

The garbage pail holder, in accordance with the first form of the invention illustrated in Figs. 1, 2 and 3, has a coaster-like base member 15 molded of a resilient material such as hard rubber and preferably molded as one homogeneous and integral piece.

Base member 15 has a centrally disposed annular cup 16 with a raised annular lip 17 tightly and removably to receive the bottom portion of an indoor "step-on" garbage pail 18 (Fig. 1) or an outdoor galvanized garbage pail 19 (Fig. 2).

An apron 20 extends outwardly from the cup 16. The apron 20 has a raised upturned peripheral edge 21 to confine droppings from the pail to the apron. Apron 20 is also inclined upwardly from the cup 16 to its peripheral edge 21 so that liquids and semi-liquids falling on the apron will flow to the cup and collect next to, but spaced from, the garbage pail.

The cup 16 and its lip 17 are proportioned so that when a garbage pail is set into the cup, the lip 17 will fit securely and closely around the bottom portion of the pail. The apron 20 is of sufficient diameter to provide a broad base for the garbage pail to prevent it from tipping over while being filled or from being tipped over by children or by dogs or other animals.

The modification of the invention illustrated in Fig. 4 is characterized by the provision of a holder having a base portion 22 molded of plastic with a centrally disposed cup 23 having an annular upstanding flange or lip 24 removably but tightly to receive a garbage pail. An elastic band 25 is secured to the top of the annular lip 24 to facilitate the gripping of the garbage pail. An apron 26 extends outwardly from the cup 23 and has a raised upturned peripheral edge 27. The apron 26 is inclined upwardly from the cup 23 to its outer edge 27.

The modification of the invention illustrated in Fig. 5 is characterized by the provision of a base member 28 having a centrally disposed cup 29 with an annular upturned lip 30 of flexible material such as plastic having the same or similar characteristics as hard rubber. An apron 31 extends outwardly from the cup 29 and has an upstanding peripheral edge 32. An annular gutter 33 is formed in the apron 31 adjacent its peripheral edge 32 and between the gutter 33 and cup 29 is a shallow trough 34. The annular lip 30 is formed of less thickness than the other portions of the base member so that it can readily be deflected to insert a garbage pail in the cup 29 and will thereupon return to its former position closely to grip the pail.

The modification illustrated in Fig. 6 is similar to that shown in Fig. 5 except that the base member 35 has a center cup 36 with a turned annular lip or flange 37 having a separate band 38 disposed therein. An apron 39 extends radially outwardly from cup 36 and has an upturned peripheral edge 40. A deep annular gutter 41 is provided in the apron 39 concentric with and adjacent the upturned peripheral edge 40, and a shallow annular trough 42 having a low circumferential rim is formed on the apron adjacent the cup 36. The shallow trough catches solid droppings from the pail while the low rim permits liquids to drain off. The gutter then retains the liquid which flows from the trough. The liquid collected in the gutter can then easily be poured off.

The modification of the invention illustrated in Fig. 7 is characterized by a base member 43 having a center cup 44 and an apron 45 extending outwardly from the cup 44. The apron 45 has a peripheral upturned edge 46, a gutter 47 adjacent edge 46 and a shallow trough 48 adjacent cup 44. Cup 44 is provided with an annular lip 49 of flexible material such as fabric or pliable thermoplastic sheeting. The lip 49 is secured at its lower edge to the base member, as by rivets 50 (only one rivet being shown). An elastic band 51 is secured to the top of the annular lip 44, the lip being folded over the band 51 and secured as by stitches 52.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A garbage pail holder, comprising a plastic coaster-like base member having a centrally disposed annular cup with a raised annular turned-down lip tightly and removably to receive the bottom portion of a garbage pail, and an apron extending radially outwardly from the cup to stabilize the pail and confine solid and liquid droppings from the pail to the apron, said base member having its cup and apron integrally formed of resilient material, said apron having an upturned peripheral edge, a deep annular gutter adjacent the peripheral edge and a shallow annular trough concentric with the gutter disposed between the cup and gutter, said trough having a low circumferential rim for retaining solid droppings and permitting liquid droppings to drain out of the trough into the gutter, whereby the liquid can be poured from said gutter free of the solid droppings in the trough, and a separate, replaceable elastic band disposed in the turned lip to maintain effective gripping of the pail by said lip.

References Cited in the file of this patent

UNITED STATES PATENTS

| | | |
|---|---|---|
| 272,239 | Haberman | Feb. 13, 1883 |
| 862,953 | Westlake | Aug. 13, 1903 |
| 871,099 | Baker | Nov. 19, 1907 |
| 1,922,127 | Foley | Aug. 15, 1933 |
| 1,959,262 | Colabrese | May 15, 1934 |
| 2,035,384 | Hinchliff | Mar. 24, 1936 |
| 2,589,967 | Sawyer | Mar. 18, 1952 |

FOREIGN PATENTS

| | | |
|---|---|---|
| 378,152 | Italy | Jan. 24, 1940 |